(No Model.)
M. P. KNEIFL.
GRAIN DISLODGING ATTACHMENT.
No. 578,754. Patented Mar. 16, 1897.
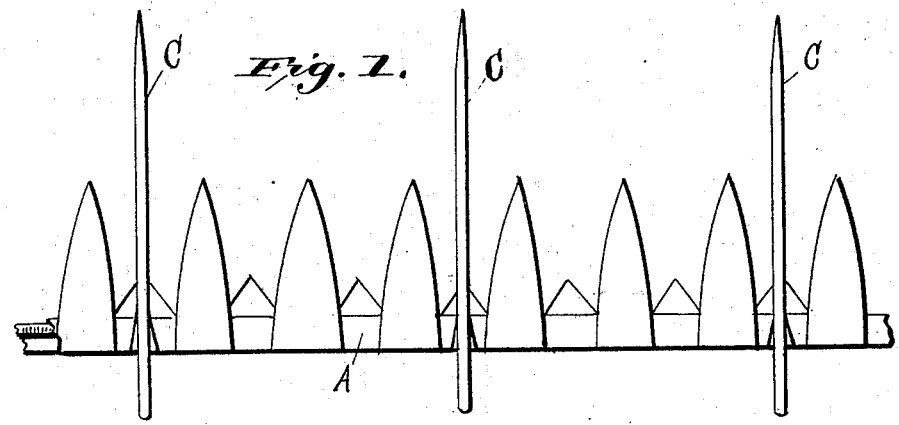
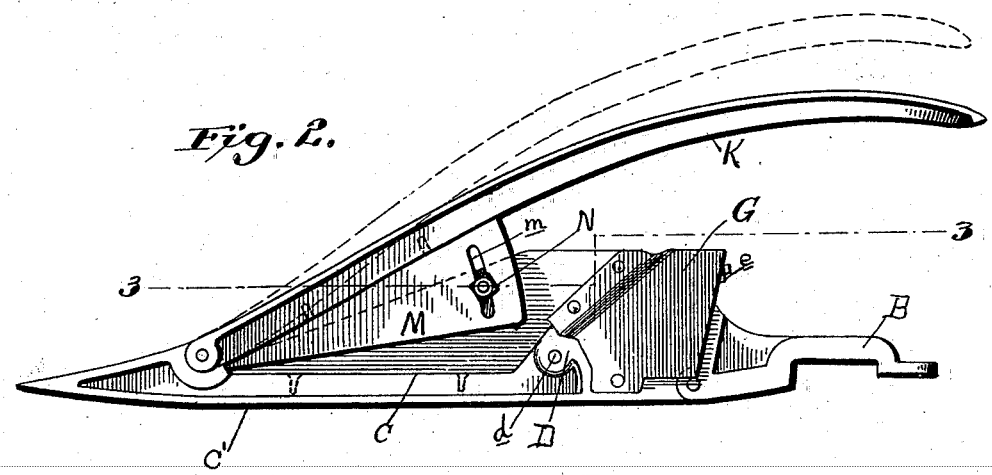
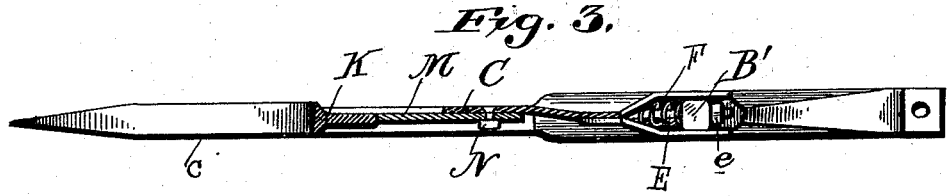
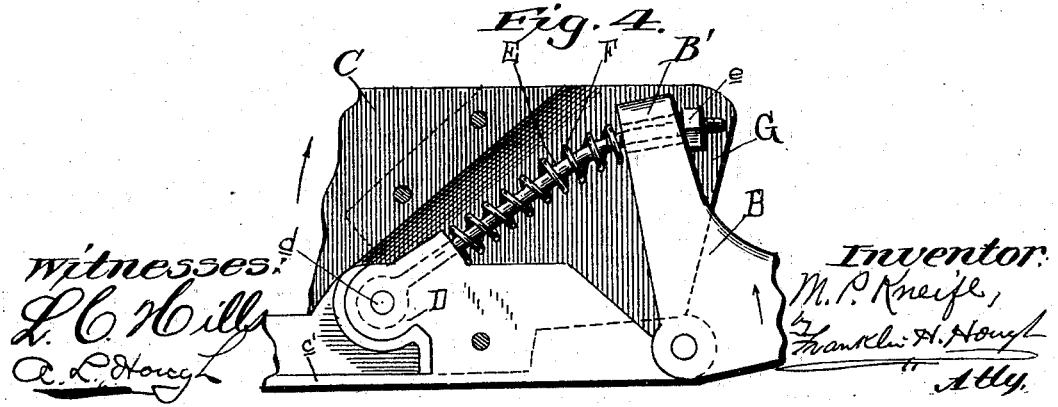

UNITED STATES PATENT OFFICE.

MICHAEL P. KNEIFL, OF NEW CASTLE, NEBRASKA.

GRAIN-DISLODGING ATTACHMENT.

SPECIFICATION forming part of Letters Patent No. 578,754, dated March 16, 1897.

Application filed December 3, 1896. Serial No. 614,324. (No model.)

*To all whom it may concern:*

Be it known that I, MICHAEL P. KNEIFL, a citizen of the United States, residing at New Castle, in the county of Dixon and State of Nebraska, have invented certain new and useful Improvements in Grain-Dislodging Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in attachments for harvesters or mowers, and especially to a device for raising up lodged grain or grass, so as to present the same in a proper position to be cut by the knives of the cutter-bar which follows behind the dislodging attachment.

A further part of the invention resides in the provision of a series of grain-dislodgers which are adapted to be secured to the finger-bar at suitable distances apart and are so constructed as to be adjustable to adapt the device for efficient operation with different heights of lodged grass or grain, as the case may be.

In connection with the dislodging attachment I provide means whereby the forward end of the dislodger will rise up and pass over an obstruction in case it suddenly comes in contact with the same.

To these ends and to such others as the invention may pertain the same consists, further, in the novel construction, combination, and adaptation of the parts, as will be hereinafter more fully described and then specifically defined in the appended claims.

The invention is clearly illustrated in the accompanying drawings, which, with the letters of reference marked thereon, form a part of this specification, and in which drawings similar letters of reference indicate like parts throughout the several views, in which—

Figure 1 is a plan view showing a series of my improved grain-dislodgers as they are to be applied to the cutter-bar of the mower. Fig. 2 is an enlarged detail view, in side elevation, of one of the dislodgers. Fig. 3 is a sectional view on line 3 3 of Fig. 2. Fig. 4 is a detail view of the device, showing the two parts that are pivoted together, which are spring-actuated.

Reference now being had to the details of the drawings by letter, A designates a finger-bar of a mower or harvester, to which several of the grain-dislodgers are to be attached at suitable distances apart, preferably from fourteen to eighteen inches. Each dislodger comprises the recessed heel portion B, which is securely fastened to the finger-bar, which latter rests in the said recess. These heel portions are preferably bolted to the finger-bar and may be readily removed, if occasion requires. Pivoted to the heel portion is the forwardly-extending pointed board C, which has a suitable shoe C'.

Mounted in the side walls of the board C, between the shoulders D, is a pin $d$, on which is carried one end of the rod E, which is inclined backward at an angle and passes through the upwardly-turned extension B' of the heel and held in place thereto by means of the nut $e$. Interposed between the shoulders D and the extension B' and on the said rod is a coiled spring F, which is provided to hold the board C and the heel B normally in the position shown in Fig. 2 of the drawings, which will allow the front end of the board C to tilt up in case it comes in contact with a stone or other obstruction. Surrounding the pivotal connections of the shoe and heel and the spring and bar or rod is a casing G, protecting the parts within from clogging up or from rusting.

Pivoted to a shoulder on the forward end of the board C, on its upper inclined edge, is the curved arm or lever K, which has a vertical adjustment to be adapted for use with different heights of lodged grain. On the under side of the said lever is the downwardly-extending guide-strip M, which is slotted at $m$ to receive the bolt N, which latter is secured to the vertical wall of the board C. By this construction it will be seen that the arm may be held at different heights, forming an unbroken curved line from the point of the shoe to the highest portion of the arm.

I am aware that it is old to construct an attachment to a mower by which lodged grain may be raised up, and hence I do not make a broad claim for such a construction.

Having thus described my invention, what I claim to be new, and desire to secure by Letters Patent, is—

1. In combination with the heel having a recessed portion, adapted to fit over a finger-bar, the shoe C, pivoted in a recess of the heel, the rod E secured at one end to a pin $d$, its other end adjustably held to an extension of the heel, and a spring F on said rod, substantially as shown and described.

2. In combination with the heel and shoe pivoted together as described, of the rod E, having an eye at one end and secured to shoulders of the board or shoe, the said rod inclined backward at an angle, and passed through an upwardly-extending portion of the heel, a nut $e$ for adjusting the angle at which it is desired to work the device, substantially as shown and described.

In testimony whereof I affix my signature in presence of two witnesses.

MICHAEL P. KNEIFL.

Witnesses:
WM. A. O'TOOLE,
JOSEPH CRYAN.